Feb. 13, 1968     L. RAYMOND     3,368,649
BRAKE ACTUATED BY VISCOELASTIC LIQUID
Filed Feb. 9, 1966
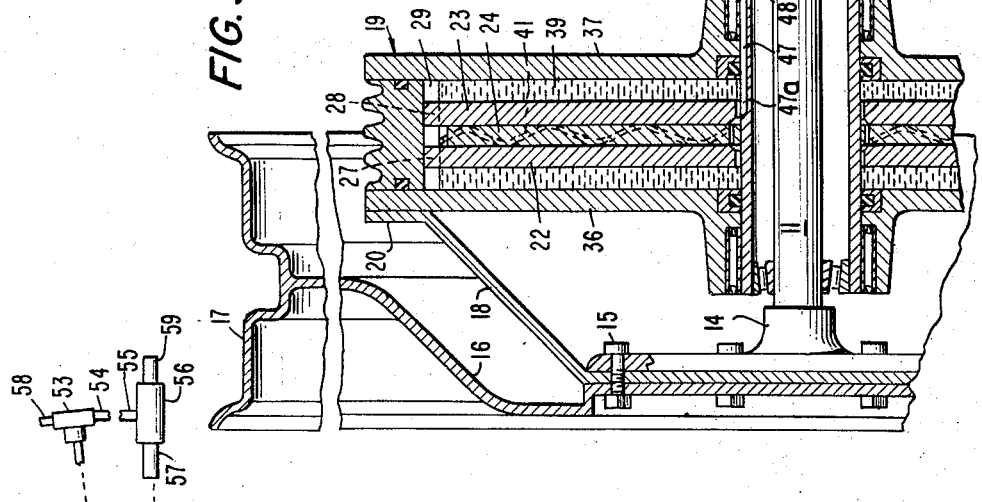
INVENTOR.
LEONARD RAYMOND
BY
*A. H. Caser*
ATTORNEY

United States Patent Office 3,368,649
Patented Feb. 13, 1968

3,368,649
BRAKE ACTUATED BY VISCOELASTIC LIQUID
Leonard Raymond, New York, N.Y., assignor to Mobil Oil Corporation, a corporation of New York
Filed Feb. 9, 1966, Ser. No. 526,137
6 Claims. (Cl. 188—90)

ABSTRACT OF THE DISCLOSURE

A brake comprising at least one pair of parallel plates whose adjacent surfaces are brought into frictional contact by virtue of the normal force effect of a viscoelastic liquid. The normal force moves one plate into contact with the other. Liquid is pumped into a clearance between the plates by conventional brake-pedal action.

---

This invention relates to a brake comprising a movable part and a non-movable part, both adapted to be brought together in braking engagement; and it particularly relates to a brake for a vehicle wherein the moving part is connected to a wheel and the non-moving part is connected to a stationary part of the vehicle associated with the wheel, such as, in the case of a rear wheel, the rear axle housing.

More particularly, and, for illustrative purposes, considering the brake as mounted on the rear wheel of an automobile, the brake comprises at least one rotatable or wheel plate, driven by the rear axle shaft or rear wheel, disposed adjacent a stationary or non-rotatable plate mounted on the axle housing. The wheel plate is not only rotatable but also axially movable toward and from the non-rotatable plate. Adjacent surfaces of the plates, which may be designated braking surfaces, are spaced apart by a narrow clearance or gap when the brake is disengaged. A rotatable liquid-tight housing or drum encloses the plates, being mounted for rotation on the axle housing and operatively connected to the wheel, and it has a driving engagement with the rotatable plate. During braking action, the housing is adapted to receive a viscoelastic liquid, which is supplied under the pressure of the vehicle driver's foot on a brake pedal and which fills the housing.

As described below in more detail, this liquid, when subjected to a shearing stress, such as is applied by the rotary movement of the rotatable plate, undergoes shear and generates a normal force the effect of which is to move the rotating plate along its axis of rotation toward the stationary plate, thus reducing the gap between the plates. The liquid undergoing shear in the narrowing gap becomes heated, and in this way the kinetic energy of the moving wheel is absorbed and transformed into heat energy, and the vehicle is effectively braked. Actual contact between the plates may take place towards the end of the braking action, but for the most part the formation of heat energy occurs in the liquid and is dissipated by it to the surrounding structures.

An advantage of the brake is its freedom from locking. It may be recalled that the phenomenon of locking, as it occurs say in a conventional hydraulic brake comprising a moving brake drum and a stationary brake-band lining or brake shoe, involves stoppage of the brake drum, as by being locked to the brake-band lining, so that the affected wheel begins to slide and the braking action is considerably reduced. In the present case, should the rotatable plate stop rotating for any reason, the shearing stress being applied to the liquid drops to zero, no normal force is generated, there is no pressure acting to keep the rotatable plate biased toward the stationary plate, and consequently the two plates are not locked together.

The brake provides advantages in quiet, smooth operation and shock attenuation when fully engaged. Structurally, it has the advantages of mechanical simplicity, tolerance to imprecision, and mechanical compactness in respect of form and weight. Additionally the liquid in the drum acts to lubricate the structures therein.

The invention may be better understood by referring to the accompanying drawing, where for convenience the brake is shown in detail in connection with its application to the rear wheel of an automobile, and where FIG. 1 is a somewhat simplified cross-sectional view of the brake as mounted on the rear axle of the car, with parts broken away, showing the brake in disengaged position;

FIG. 2 is a view along the line 2—2 of FIG. 1; and

FIG. 3 is a view like FIG. 1 but of only a part of the construction and showing the brake in engaged position.

In FIG. 1 there is shown a rear axle 10 comprising a shaft 11 supported for rotation by bearings, the outer one of which is shown at 12, in the axle housing 13. The shaft 11 is suitably connected to wheel hub 14, to which there is fastened, as by bolts 15, the wheel disc 16 which supports the hub relatively to, and connects the same with, the wheel rim 17. Means in the form of a rotatable dish-shaped support member 18 provide a driving engagement between shaft 11 and a rotatable drum 19. The member 18 is connected to hub 14 by the bolts 15, and it has a flanged peripheral portion 20 fastened to the drum 19 as by bolts, one of which is shown at 21. As will be understood, the hub 14, disc 16, rim 17, member 18, and drum 19 all rotate with the shaft 11.

The axle 10 is of the semi-floating type, although it may be of any type, and is not restricted to a rear axle.

The drum or housing 19 encloses a pair of axially movable, axially spaced rotatable plates 22 and 23 which are interleaved with a central non-rotatable plate 24. Plates 22 and 23 are centrally apertured at 25 and 26 for mounting on, and rotation relatively to, the axle housing 13, while plate 24 is also centrally apertured for mounting on housing 13 but is fixedly secured thereto. Means are provided in the drum to drive plates 22 and 23, comprising a key and keyway arrangement; thus the peripheral portions of plates 22 and 23 are slotted at 27, 28 to receive a key 29 attached to the inner side of the annular wall portion 30 which forms a part of the drum 19. Plates 22, 23 also engage the annular wall portion 31, disposed opposite the portion 30, by means of a key and keyway arrangement at 32, 33 and 34. As is apparent, plates 22 and 23 are of larger diameter than plate 24. Wall portion 30 is serrated at 35 to help dissipate heat, and it will be understood that such serrations or cooling fins may be disposed at other portions of the drum, including the side walls thereof, to help dissipate heat. The portion 31 is fixed to the drum end pieces 36, 37 as by means of bolts, one of which is shown at 38, and it will be seen that member 18 is also secured to the drum in this way. Suitably, portions 30 and 31 may alternate around the periphery of the drum.

Drum 19, together with the axle housing 13, encloses a chamber 40 within which the plates 22, 23 and 24 are disposed, with plate 24 substantially bisecting the chamber. Means are provided, when the brake is disengaged for keeping the rotatable plates 22 and 23 out of braking contact with the non-rotatable plate 24, i.e., in the position shown in FIG. 1, comprising a serpentine length of spring 41 which extends sinuously around the plate 24. Spring 41 is spaced just beyond the peripheral edge of plate 24, i.e., it is disposed between such edge and the keys 29, 32, and alternately bears on plates 23 and 22, as at 42, 43, 44, etc. Note FIG. 2. The spring thus axially spaces plates 22 and 23 away from plate 24 such that clearances are present at 45 and 46, the width of which is exaggerated for clarity of illustration.

As is apparent, the drum 19 is rotatably mounted on the axle housing 13 by means of the roller bearings 70, 71. Liquid-tight seals are provided at 72 and 73, and another pair of seals at 74 and 75.

In order to engage the brake, the chamber 40 must be filled with the described viscoelastic liquid 39, which suitably may be introduced to it through a groove 47 of narrow width cut in the surface of axle housing 13. Feeding the groove is a conduit 48 whose end portion 48a may be secured in the groove entrance as by being threated thereto. End portion 48a may be cut away, as at 48b, to provide a side opening through which liquid may pass from the conduit into the groove. Liquid leaves the groove at 47a to enter the chamber 40. At 61 is a liquid seal. A reservoir of the liquid is maintained adjacent the chamber, and suitable this may comprise a master cylinder 49 such as is used in conventional hydraulic braking systems. The brake pedal 50, the cylinder and its piston (not shown), and the associated conduits comprise means for rapidly pumping the liquid from the reservoir portion, shown in part at 51, of cylinder 49 to the chamber 40 by way of lines 52 and 48. If only one wheel and brake are involved, line 52 is directly connected to line 48; but if four wheels and brakes are involved, liquid may be pumped through line 52 to the T-connection 53, then by lines 54 and 55 to the T-connection 56, then by lines 57 and 48 to the drum 19. As will be understood, the front wheels may be supplied by line 58, and the other rear wheel by line 59. If only rear wheel brakes are present, line 52 is directly connected to line 55. A reserve tank (not shown) may also be used to supply the reservoir 51 with additional liquid.

By depressing the brake pedal 50, liquid may be pumped rapidly into the chamber 40 of drum 19 so as to fill the same. As indicated, one of the functions of the liquid in the drum is to aid in transforming the mechanical energy of the rotating plates 22 and 23 into heat energy. The property of the liquid by which such transformation is achieved may be termed "viscous drag," by which is meant the resistance offered by the liquid to the rotating plates. In other words, the moving energy of the plates is expended in applying a rotary shearing stress of the liquid, producing a liquid in shear plus an amount of heat. The heat is absorbed by the liquid and the associated structures and is dissipated from the external surfaces of the drum to the surrounding atmosphere.

By virtue of another function of the liquid, plates 22 and 23 are brought closer to non-rotatable plate 24. The rotation of plates 22 and 23 applies a rotary shearing stress to the liquid in the clearances 45 and 46, and the liquid then undergoes rotary shear and produces a force normal to the plates. Initially the effect of this force is to move plates 22 and 23 away from plate 24; however, a characteristic of the liquid, and of the normal force or normal pressure phenomenon that is involved, is that the normal force is greater adjacent the axis of rotation of plates 22 and 23 than at points remote from such axis, i.e., points disposed toward the periphery of the plates. Advantage is taken of this last noted characteristic by providing axial passages 62, 63 in plate 22 and 64, 65 in plate 23. These passages are radially spaced in each plate, and as shown, the passages 63 and 65 serve as flared entrances for the passages 62 and 64. During generation of the normal force effect, liquid of maximum normal force may transfer through passages 62, 63 of the plate 22 into the gap at 66 where it exerts pressure sufficient to axially move plate 22 toward plate 24, thereby decreasing the clearance 45. Similarly, liquid transfer through passages 65, 64 into the gap 67 where it exerts pressure sufficient to move plate 23 towards plate 24, thus decreasing clearance 46.

Although not readily apparent in FIG. 1, gaps 66 and 67 are of definite size and are readily entered by the liquid. At 68 is shown one of a series of radially arranged passages in plate 24, the purpose of which is to favor transfer of the liquid of increased normal force. Thus, if such liquid on the right side of plate 24, as seen in FIG. 1, does not readily enter passages 65, 64, an opportunity is provided for it to transfer through passages 68 and join the liquid in clearance 45 which is moving into passages 63, 62. Similarly, passages 68 provide for transfer in the opposite direction.

As plates 22 and 23 move toward plate 24, the viscous drag effect of the liquid on them increases, thus progressively retarding their rotation; also, the moving plates 22 and 23 act to compress the liquid in the narrowing clearances 45, 46, thus increasing the viscosity of the liquid. In turn, such liquid of increased viscosity offers greater resistance to the shearing stress applied by the rotating plates, and the effect is to further reduce the rotational speed of the plates and consequently of the drum 19 and the wheel.

The described braking action continues until the relative position of the plates may be shown in FIG. 3, where metallic contact may be present, i.e., plates 22 and 23 may be in contact with plate 24, there being little or no liquid present between the plates. Strictly speaking, the contact is between the braking surfaces 22a, 24a and 23a, 24b of the plates. Complete stoppage of the wheel is brought about when the plates are in the position shown in FIG. 3. It may be noted that spring 41 is compressed along its length by the plates 22 and 23 and will remain in this state of compression as long as the normal force effect is present. When plates 22 and 23 have ceased to rotate, no shearing stress is applied to the liquid, no normal force effect is present, and plates 22 and 23 then come under control of the spring which moves them to the position shown in FIG. 1. Pressure on the brake pedal is removed when wheel stoppage is achieved.

In the last-mentioned spaced-apart position of the plates, and with the wheel or wheels stopped, liquid remains in the drum 19 even though no pressure is applied to the brake pedal. Assuming now that the vehicle is started again and begins to move, the plates 22 and 23 will rotate, thus applying a shearing stress to the liquid, which then undergoes shear and produces the described normal force. With no pressure being applied to the liquid by the brake pedal, the normal force effect causes the liquid to follow the path of least resistance, which means that it is pumped from the drum through groove 47 and it flows via line 48 back to reservoir 51. All of the liquid may flow back to the reservoir in this way except the adherent thin films. The latter, it may be noted, act to lubricate the structures.

It will be understood, therefore, that when no brake pressure is applied, the liquid in the drum is pumped out to the reservoir by the normal force effect; and when brake pedal pressure is present, the liquid does not leave the drum but rather, under the influence of the normal force effect, acts to axially move plates 22 and 23 toward plate 24.

In respect of the described liquid, it is characterized as being viscoelastic, that is, a liquid which exhibits both viscous and elastic behavior; thus it has flow properties of a liquid and elastic properties of a solid.

Besides being viscoelastic, the liquid is one which exhibits the phenomenon described, namely, during shear, as brought about by the application of a shearing stress, it produces a force normal to the described braking surfaces. The direction of this force may be apparent by considering a pair of flat, circular, substantially parallel, coaxially disposed plates separated from each other by a small uniform gap which is filled with the liquid. If one of the plates is rotated relatively to the other, the normal forces produced express themselves as forces which try to move the plates further apart. This may illustrate the direction of the forces. It should be noted that the normal forces occur along the common axis of rotation of the plates and also are distributed radially from the center of each plate to the periphery. The normal forces are greatest along the common axis and decrease steadily as one moves toward the periphery. At the periphery the normal forces are about zero. Summarizing, the normal forces are normal to the opposed radial surfaces of the plates; the forces occur along the axis of rotation of the plates and are radially distributed from such axis to the periphery; and the forces are greatest along the axis of rotation and zero at the periphery. It will be understood that references to normal force or normal pressure have the foregoing significance.

The liquid is of course a viscous one, for it is by virtue of this property that a "viscous drag" is created whereby the speed of the rotating plates is retarded, i.e., whereby mechanical energy is converted to heat. A viscous liquid is required for a strong normal force effect.

An example of a suitable liquid is a 33% by weight solution in mineral oil of polyalkylmethacrylate of a viscosity average molecular weight of about 200,000. The mineral oil has a kinematic viscosity of about 15 centistokes at 100° F. and about 4 centistokes at 210° F. This solution exhibits an apparent viscosity of about 120 poises at a shear rate of one reciprocal second and at 77° F. At shear rates ranging from about 100 to 1,000 reciprocal seconds, and at a temperature of 77° F., the liquid exhibits a normal force, expressed as lbs. of total thrust, ranging from about 0.08 to about 0.7 lb. when tested in a parallel plate rheogoniometer having a shearing element of a radius of only 0.79 inch and a maximum speed of only about 100 r.p.m. This relationship between normal force and shear rate is not a linear one for this liquid. On scale up, the thrust value would reach a maximum of 28 lbs. at 1000 reciprocal seconds on increasing the radius of the shearing element to 5 inches; and if the rotary speed were increased 10 times, the shear rate would increase to 10,000 reciprocal seconds and the thrust, which increases less than linearly with shear rate, would increase to over 200 lbs. It is thus apparent that the liquid is capable of a normal force of substantial value.

Besides the liquid described, a number of viscoelastic liquids which exhibit the normal force phenomenon are available and may be chosen from both aqueous and non-aqueous systems. They include solutions of high polymers in non-aqueous solvents, high polymers in liquid form, and solutions of certain soaps dissolved in hydrocarbon solvents. More particularly, the liquids include polyisobutylene in mineral oil, poly(alkyl methacrylates) in mineral oil or in dimethylphthalate, polyisobutylene in decalin or in o-dichlorobenzene, rubber in xylene or in benzene, polystyrene in decalin or in dimethylphthalate, methylcellulose or sodium carboxymethylcellulose in water, aluminum or calcium soaps of fatty or naphthenic acids dissolved in hydrocarbons, glue in water, etc. The liquid selected should of course be chosen with an eye on the temperature conditions under which it will be used; thus, if the brake operates in sub-zero weather, the liquid should not freeze or become undesirably viscous; and at high temperatures, as may be encountered during service, it should not undergo excessive vaporization.

Desirably these liquids should have an apparent viscosity in the range of about 1 to 1000 poises or more at a shear rate in the range of about 10,000 to 1 reciprocal seconds; and they may exhibit a normal force of up to several hundred pounds of thrust, or from a few tenths, or even hundredths, to one or two hundred p.s.i. These are illustrative values.

Of interest is the fact that when the shear zone is filled with liquid, the rotary speed of the shearing element or plate varies directly with the normal force, i.e., the normal force increases with increasing speed of the plate.

It is also interesting to note that while the rotary stress applied to a liquid increases with the shear rate, the normal force can increase with the shear rate even more rapidly than the rotary stress. Thus, at a shear rate of 100 reciprocal seconds, the normal force may be up to 10 times greater, or more, than the rotary stress.

As will be understood, the braking surfaces, since they may come into actual contact, may be made of any suitable material, particularly a material which effectively transfers heat, is heat- and wear-resistant, and which has a good coefficient of friction. Useful materials include metals like pressed steel, cast iron, cast steel; also alloys like nickelchromium; also sintered metals such as a compacted mixture of powdered iron and graphite, or powdered copper and graphite, which is then sintered; or powdered bronze may be placed on a plate of steel or cast iron and sintered. Also useful are sintered mixtures of a ceramic material and a metal powder. Another suitable material is a mixture of asbestos, resin, and a filler suitably formed or molded into a sheet or plate. These materials may be in the form of coatings or liners on a base structure, or if desired, the entire plate may be formed of the material.

The braking surfaces may be grooved or otherwise indented to aid lubrication, reduce wear, facilitate separation on disengagement, and for other purposes, without impairing braking action.

The plates and drum walls are of suitable thickness to provide required strength and to keep the temperature from becoming excessively high. In this connection, cooling fins may be provided not only on peripheral surfaces of the drum, as shown, but also on outer radial surfaces thereof. Forced cooling, as by power-operated air jets, may be employed. The plates are preferably flat or near flat, circular, substantially parallel to one another, and coaxially disposed. The dimensions of the brake may be of the same order as conventional automobile hydraulic brakes, and it is capable of absorbing substantially the same order of power, i.e., about 50 to 350 horsepower. The number of interleaved rotatable and non-rotatable plates is variable. In FIG. 1, one stationary plate is shown with two rotatable plates, and this arrangement may be considered to comprise a "unit," although it is possible, as where only small amounts of braking power are required, to use one stationary plate and only one rotatable plate. Desirably, a plurality of "units" are employed, ranging say from two to four or five or more. Preferably each unit of a group is separated from the next unit by a rotatable wall, such as wall 37, which does not move axially. By increasing the number of plates and/or the size thereof, larger amounts of power can be absorbed.

The brake is applicable to any conventional braking system, using any number of wheels, including a mechanical system where the energy applied to the brake pedal is transferred to the brake mechanism by mechanical means such as rods and cables, or a hydraulic system where the energy is transferred by an oil or other fluid, or a pneumatic system where air is used to transfer the energy. The invention is also applicable to power braking systems where the energy for operating the brakes is supplied at least in part by the engine. Also, the invention may be used in emergency braking systems as well as in service brake systems.

Although the brake has been described in connection with a vehicle wheel, it is to be understood that this is for illustrative purposes and that it is capable of wider application, being useful on any vehicle or machine, or machinery unit, having a rotating wheel or shaft which it is desired to brake down.

It will be understood that the invention is capable of obvious variations without departing from its scope.

In the light of the foregoing description, the following is claimed:

1. A brake for retarding the speed of rotation of a rotatable member having associated therewith a non-rotatable member, said brake comprising an axially movable, rotatable plate driven by said rotatable member and axially spaced therefrom a non-rotatable plate fixedly connected to said non-rotatable member, adjacent surfaces of the plates forming a pair of braking surfaces, a reservoir of a viscoelastic liquid adjacent said plates, means for pumping liquid from the reservoir to the space between said plates and maintaining the same therein, said liquid by virtue of its viscousness supplying a resistance to rotation of the rotatable plate, said rotatable plate having axial passages adjacent the axis of rotation thereof, said liquid, upon rotation of the rotatable plate, being subjected to rotary shearing stress, whereby it undergoes rotary shear and produces a force normal to said plates, said force being greater adjacent the said axis of rotation than at points remote from said axis, said liquid of greater force transferring through said axial passages to the surfaces of the rotatable plate opposite said braking surface and exerting pressure thereon such as to axially move the rotatable plate toward the non-rotatable plate, thereby to increase the resistance by the liquid to rotation of the rotatable plate and to progressively retard said rotation.

2. The brake of claim 1 wherein said rotatable member is a wheel and said non-rotatable member is an axle housing.

3. The brake of claim 1 wherein a rotatable plate is disposed on each side of the non-rotatable plate, thereby to form two pairs of said braking surfaces.

4. The brake of claim 1 wherein a plurality of rotatable plates and a plurality of non-rotatable plates are interleaved, thereby to form a plurality of said pairs of braking surfaces.

5. A brake for a rotatable wheel associated with a non-rotatable axle housing, said brake comprising a non-rotatable housing plate and axially spaced therefrom a pair of axially movable, rotatable wheel plates, adjacent surfaces of the plates forming pairs of braking surfaces, each pair of said surfaces having a clearance therebetween when the brake is disengaged, a reservoir of a viscoelastic liquid adjacent said clearances, conduit means for placing said reservoir in communication with said clearances, spring means acting on the rotatable plates for maintaining said clearances at a width such that the brake is disengaged, means for pumping liquid from the reservoir to said clearances, said liquid by virtue of its viscousness supplying a resistance to rotation of the rotatable plates, said rotatable plates having axial passages adjacent the axis of rotation thereof, said liquid, upon rotation of the rotatable plates, being subjected to a rotary shearing stress whereby it undergoes rotary shear and produces a force normal to said plates, said force being greater adjacent the axis of rotation of the rotatable plates than at points remote from said axis, said liquid of greater force transferring through said axial passages to the surfaces of the rotatable plates opposite said braking surfaces and exerting pressure thereon such as to axially move the rotatable plates toward the non-rotatable plate against the action of said spring means, thereby decreasing the width of said clearances and enabling the rotatable plates to come into braking engagement with the non-rotatable plate.

6. In a brake for a rotatable axle shaft disposed in a stationary housing, the improvement comprising a non-rotatable plate fixedly mounted on the housing, a pair of axially movable, axially spaced rotatable plates driven by said shaft and mounted for rotation on the housing, said rotatable plates being interleaved with said non-rotatable plate so that adjacent surfaces of said plates form braking surfaces, each rotatable plate having axial passages therethrough adjacent the axis of rotation thereof, a rotatable drum enclosing said plates and forming a chamber, means for providing a driving engagement between said axle shaft and drum, means in the drum for driving said rotatable plates, means for keeping the rotatable plates out of braking contact with the non-rotatable plate during non-braking operation of said brake, a reservoir of a viscoelastic liquid adjacent said chamber, means for pumping the liquid from the reservoir to the chamber, said liquid by virtue of its viscousness supplying a resistance to rotation of the rotatable plates, said liquid being characterized, when subjected to rotary shearing stress by said rotatable plates, by undergoing rotary shear and producing a force normal to said plates, said liquid being further characterized by the fact that said force is greater adjacent said axial pasages of the rotatable plates to the surfaces axis, said liquid of greater force being transferable through said axial passages of the rotatable plates to the surfaces of the latter opposite said braking surfaces and exerting pressure thereon sufficient to axially move said rotatable plates toward said non-rotatable plate, thereby to increase the resistance by the liquid to rotation of the rotatable plates and to progressively retard said rotation.

References Cited
UNITED STATES PATENTS

| | | | |
|---|---|---|---|
| 973,893 | 10/1910 | Tichomiroff et al. | |
| 2,301,292 | 11/1942 | Krick | 192—57 |
| 2,727,594 | 12/1955 | Ganster | 188—90 |
| 2,743,792 | 5/1956 | Ransom | 188—90 |

MILTON BUCHLER, *Primary Examiner.*

G. E. HALVOSA, *Assistant Examiner.*

UNITED STATES PATENT OFFICE
CERTIFICATE OF CORRECTION

Patent No. 3,368,649                      February 13, 1968

Leonard Raymond

It is hereby certified that error appears in the above numbered patent requiring correction and that the said Letters Patent should read as corrected below.

Column 3, line 18, for "suitable" read -- suitably --; line 45, for "of" read -- to --; column 4, line 22, for "be" read -- be as --; column 7, line 16, for "surfaces" read -- surface --; column 8, lines 33 and 34, for "axial pasages of the rotatable plates to the surfaces axis," read -- axis of rotation than adjacent areas remote from said axis, --.

Signed and sealed this 6th day of May 1969.

(SEAL)
Attest:

Edward M. Fletcher, Jr.

Attesting Officer

Commissioner of Patents